Dec. 15, 1970  G. H. ERB  3,546,754
SEPARABLE FASTENER
Filed Aug. 12, 1968
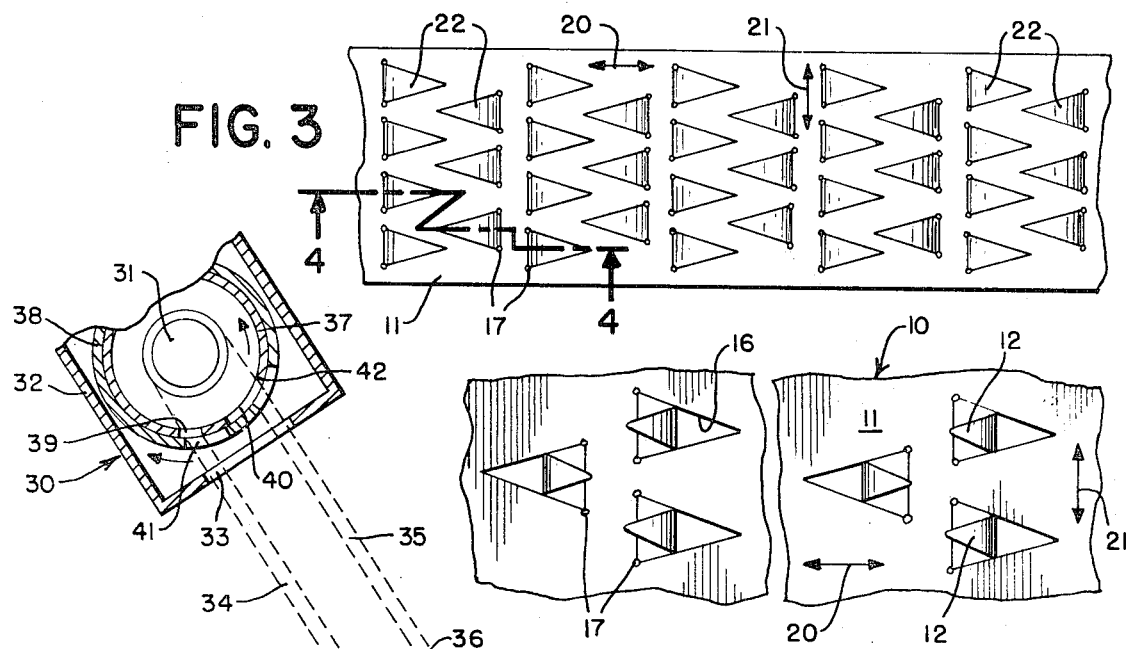
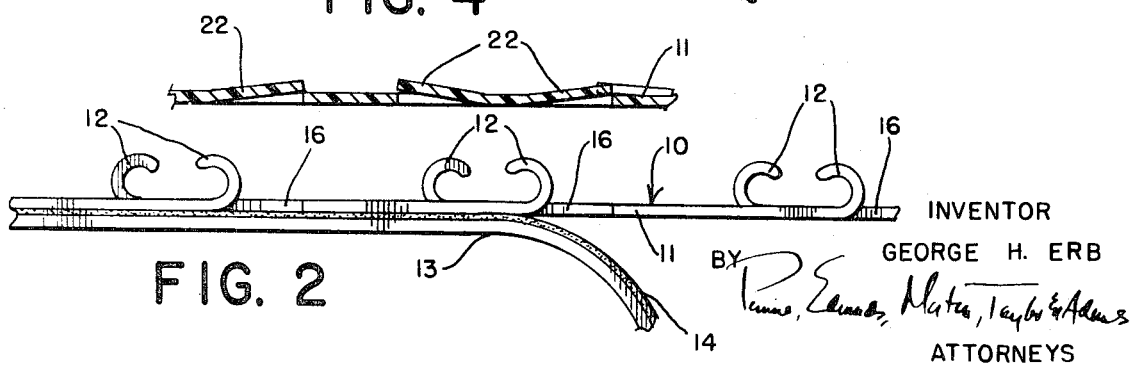
INVENTOR
GEORGE H. ERB
BY
ATTORNEYS

United States Patent Office 3,546,754
Patented Dec. 15, 1970

3,546,754
SEPARABLE FASTENER
George H. Erb, Rte. 103, Cuttingsville, Vt. 05738
Filed Aug. 12, 1968, Ser. No. 751,831
Int. Cl. A44b *13/00, 21/00*
U.S. Cl. 24—204                    7 Claims

ABSTRACT OF THE DISCLOSURE

A hook member is formed from non-woven sheet material for use in a separable fastening device of the type having two complementary members each provided with an engaging surface having thereon a very large number of hooking elements of the hook and loop type; the members are joined by pressing the engaging surfaces together with a large number of hooks and loops becoming inter-engaged whereupon they become resistant to separation by forces generally parallel to the interface plane of the surfaces and are readily separable by peeling forces applied substantially normal to the plane. The hooks in the hook member are formed from portions of the non-woven sheet displaced out of the plane thereof into a generally upright position by the steps of displacing the portions of the sheet material, and deflecting and heat treating these portions to form the hooks.

BACKGROUND OF THE INVENTION

Field of the invention

This invention relates to a hook member for use in a separable fastening device of the type having two complementary members, each provided with a base and a large number of resilient, inter-engageable hooking elements extending from the base, some of the elements being hooks and the others loops. The invention also relates to a method and an apparatus for manufacturing the hook member.

Description of the prior art

U.S. Pats. Nos. 2,717,437; 3,083,737 and 3,154,837 disclose various forms of fastening devices of the type having hooking elements formed from flexible, resilient material into hooks and loops, which extend from the engaging surfaces of two joinable members. When these surfaces are pressed together in face-to-face relationship, a large number of the hooks engage a large number of the loops, the joined members then being resistant to separation by forces parallel to the interface plane, but being readily separable by peeling forces substantially normal to the plane.

The members of the fastening devices described above are made of threads integrally woven into a web or matrix with portions of certain threads extending from the web surface as rows of loops. Those loops which are either severed or have a segment removed become hooks for engagement with other uncut loop elements. The matrix of this type fastener has at least moderate thickness in order that its woven base part have adequate body and strength to support the hooks. Certain of the threads must have sufficient diameter and strength to function as hooks, and thus the minimum thickness of the base part is at least the sum of thread diameters where they cross in the matrix. Prior art methods for manufacturing the devices just described require precision weaving machinery designed to execute various steps which include weaving the base sheet, forming and processing the loops, and severing certain of the loops to form hooks.

SUMMARY OF THE INVENTION

The present invention relates to a hook member and a method and apparatus for its manufacture, the hook member being used in a separable fastening device of the type having two complementary members each provided with an engaging surface having thereon a very large number of hooking elements. Certain of these elements are hooks, others are loops, and when the engaging surfaces are pressed together a large number of these hooks and loops become inter-engaged such that the members then resist separation by forces generally parallel to the interface plane of the surfaces.

The new hook member comprises a base of non-woven sheet material and a plurality of spaced hooks, each being a portion of the sheet displaced out of the plane of the sheet. Each hook has a base-end adjacent the sheet and integral thereto and a tip-end spaced from the base-end and adapted to engage loop elements of the complementary member. In one preferred embodiment the sheet material is a heat-treatable, pre-stretched and thereby axially oriented thermoplastic, and is shrinkable in one of its surfaces in response to heat applied to that surface only. Hooks formed from this material are shrunk on one side and thereby curled along the stretch axes into their hook shape.

The method of making this hook member comprises a series of steps, the first of which is displacing spaced portions of the sheet out of the plane thereof, and then deflecting and heat-treating the portions to form the hooks in a generally upright position with respect to the base. Hook portions of the heat-shrinkable sheet material are heated on one side progressively from their tip-ends to their base-ends, thereby shrinking the heated side of these portions which then curl to an upright position. Parts of the sheet adjacent the hook portions are shielded from the heat and are thus unchanged.

Apparatus for practicing the new method comprises a support member having teeth extending outwardly and spaced to correspond with the spacing of the hooks. When sheet material is disposed against the support, the hook portions register with the teeth and are deflected outward. Spaced from the support is a heat source that directs a beam of heat to the base sheet on the support. A heat-resistant shield is placeable between the heat source and the base sheet, the shield having perforations to expose only the hook portions of the base for heat absorption. Preferably either the beam or the sheet is moved so that the hooks are heated progressively from their tip-ends to their base-ends.

The hook member as taught by the present invention has an entirely new and different structure from prior art woven hook members, and has very desirable advantages over such members. A preferred sheet material for the new member is a prestretched and thereby axially oriented thermoplastic such as polyethylene terephathalate. The thickness of such sheets may be as small as three mils, and no additional thickness is required for the hooks since they are merely portions of the original sheet displaced out of the plane of the sheet into a generally upright position. These very thtn hook portions are, nevertheless, sufficiently strong and resilient because of the inherent strength of the sheet material, and because they may have variable thickness and various shapes which render them substantially wider than a single strand of thread as in the prior art. Summarily, the base part of these fastener members has an almost insignificant thickness such that they can be used almost regardless of space limitations.

As described in greater detail below, the method of manufacturing this new hook material is so inexpensive as compared to prior art methods, that it may be economically feasible for the resulting fasteners to be considered disposable after a few or possibly even a single use. The method comprises a series of steps which take advantage of a combination of physical properties of heat-shrinkable thermoplastic sheet material or its equivalent. While the particular properties of such material are known, these properties have never been used here in the combination now disclosed or with the results here achieved.

BRIEF DESCRIPTION OF THE DRAWINGS

FIG. 1 is a fragmentary plan view of a hook member of this invention;

FIG. 2 is an elevation view of the member in FIG. 1;

FIG. 3 is a fragmentary plan view of a base sheet with portions cut to form hooks;

FIG. 4 is a partial sectional view of the base sheet taken along lines 4—4 in FIG. 3;

FIG. 5 is a fragmentary elevation view partially in section of apparatus for manufacturing the hook member; and FIG. 6 is a fragmentary elevation view of the hook member engaged to a loop member.

DESCRIPTION OF THE PREFERRED EMBODIMENT

In FIG. 1, a fragment of the new hook member 10 is shown comprising the base sheet 11 and spaced hooks 12. The same product is shown in elevation view in FIG. 2, with the addition of a stiffening backing sheet 13 secured to sheet 11 by an adhesive layer 14. The hooks 12 are initially triangular tabs 22 formed from cuts 16 prior to being erected into the opposing positions shown. Round holes 17 are provided at the base-end of each cut 16 to prevent tearing at these sharp intersections. FIG. 3 shows a strip of sheet material 11 with the tabs 15 cut, but not yet erected into their hook shapes. As shown in FIGS. 1 and 3, the hooks are disposed in rows transverse to the longitudinal axis of strip 11, with all the hooks being aligned along this axis, but with the hooks of each row being oriented oppositely to the hooks in the immediately adjacent rows.

Each hook comprises a portion of the sheet displaced out of the plane of the sheet into a generally upright position, each having a base-end adjacent the sheet and integral thereto and a tip-end spaced from the base-end. The hooks are flexible and resilient, with their tip-ends configured to releasably engage loop elements of a complementary member of the fastening device. Alternatively, only the tip-end is flexible and resilient and may have additional loop-engaging means for said releasable engagement. Furthermore, a rectangular shape or a variety of other shapes are suitable for the hooks so long as the tip-ends are configured to engage the complementary loop elements. The height of the hooks above the plane of the base sheet is in the range of 10–100 mils, the exact height being selected to cooperate efficiently with the loop or pile elements of a mating fastener member. Since the hooks are displaced portions of the sheet 11, they have the same thickness as the sheet, being in the range of about 0.5–15.0 mils.

The preferred embodiment of this invention is made from a thermoplastic sheet having a combination of properties which can be found in certain materials such as polyethylene terephthalate resin. This particular product is commercially made by the E. I. du Pont de Nemours Co. under the trademark Mylar and is conveniently available as sheets and strips. Standard Mylar sheet is preferred because it is bi-axially oriented, in that it has been stretched along two perpendicular axes during the course of its manufacture; thus when the sheet or portions thereof are heated, this heated material will shrink along the stretch axes to new dimensions which remain permanent unless the sheet is reheated and restretched. The present method takes advantage of these properties in the formation of the hook member. However, a mono-axially oriented thermoplastic sheet would also be suitable. Other sheet materials that shrink in response to some other treatment such as chemical, electrical or radiation can also be used.

The property of shrinking in response to heat of polyethylene terephthalate sheet is somewhat similar to that of a bimetallic laminate, wherein one of two dissimilar materials adjacent to each other contracts (or expands) at a greater rate than its neighboring lamina with the result that the composite laminate curls. But this plastic sheet has a poor coefficient of heat transfer, and when one side only is heated the opposite side remains substantially unheated. Since only the heated side shrinks, the two sides function differently, as do the dissimilar layers of a bimetallic laminate. As a result of the shrinking of one side of the plastic sheet (or one lamina of a laminated) relative to the other side, the plastic sheet or laminate bends and curls as a unitary body, this being the property by which the hooks are formed. A further relevant physical property of the polyethylene terephthalate material is that after it is heated, shrunk and thereby curled, it remains in this condition, rather than uncurling to its original state as would be the case with a typical bimetallic element.

As was indicated above, the plastic sheet is originally prestretched in two directions indicated by arrows 20 and 21 in FIG. 3, and upon being heated this material contracts or shrinks along lines in which it was stretched. The hook elements formed in this sheet material are all oriented in one direction of stretch, such that when these hooks are heated, their shrinkage and curling will be along lines parallel to the lines of original stretch. It is possible to orient the hooks along both the stretch axes which would result in more secure engagement of the hook and loop members; however, during manufacture the hooks are preferably heated progressively along their respective axes, and hooks oriented in two or more directions would greatly complicate the heating process.

When using polyethylene terephthalate sheet material described above or other non-woven heat-responsive material, or a shrinkable bi-laminate material the hook portions of the sheet are shrunk and curled in the direction of the more shrinkable side or lamina. The properties of flexibility and resilience of the sheet material are retained by the hooks even after heating and shrinkage, because this change in internal structure has occurred only in the heated side of the sheet, and the opposite side retains its original condition.

In the preferred method for making the above-described hook member, a strip of the polyethylene terephthalate sheet is punched or cut (by apparatus not shown) to displace portions of the sheet out of the plane of the sheet and thereby form rows of tabs 22 as indicated in FIG. 3. These displaced tabs are shown more clearly in FIG. 4 and in the strip approaching the toothed wheel in FIG. 5, and they are subsequently deflected and heat-treated to occupy a generally upright position with respect to the base sheet. Before the heating step, the parts of the sheet between the tabs are shielded; a beam of heat is then directed progressively upon the outside surface of each tab from its tip-end to its base-end, with the heat being controlled to prevent the inside surface of the tab or hook portion from being heated enough to shrink like the outside surface.

FIG. 5 shows a preferred apparatus for practicing the above process. Mounted rotatably on a base not shown is cylindrical wheel 23 with teeth 24 extending from the peripheral surface of the wheel, the teeth being spaced to correspond with the spacing of tabs 22 in the sheet of FIG. 3. Sheet 11 in the form of a strip is wrapped around the wheel and registered thereon such that each tooth contacts a tab and deflects it out of the plane of the sheet as indicated by tooth 24A and tab 22A. A shielding tape 25 having approximately the same width as the sheet 11 is also wrapped around the wheel on top of the sheet, and drive means, not shown, rotates the wheel intermittently, carrying the sheet and tape as will be explained below. The tape has a plurality of perforations 26 corresponding to tabs 22 and is registered upon the wheel such that the perforations expose the tabs, and all other parts of sheet 11 remain covered and shielded. Obviously, a variety of other shielding techniques might be used, including the application of a coating material to those parts of the sheet to be shielded, or the insertion of a movable barrier between the sheet and the heat source which can be slotted to concentrate the heat source on the tips of the tabs regardless of their orientation.

FIG. 5 shows a heat source 30 having a generally longitudinal shape such that it will provide heat along the entire width of the sheet being treated and thus effect all the tabs in a given row at the same time. The source comprises the infra-red lamp 31 mounted in the housing 32 which has principal housing window 33 through which the heat beams 34 and 35 pass to contact the respective rows 36 of tabs. The heat lamp radiates heat in all directions, and since it is desirable to form the heat into beams the apparatus includes two concentric cylinders 37 and 38 which surround the elongate heat source and are rotatably mounted within the housing 32. Cylinder 37 has two spaced elongate windows 39 and 40, cylinder 38 has two similar windows 41 and 42, and the two cylinders are independently rotatable in opposite directions. A lens or other means may be positioned relative to the heat lamp to concentrate the heat source in the direction of the wheel 23.

With the cylinders in their relative positions shown in FIG. 5, heat beams 34 and 35 will be spaced as shown and will be directed to the tip-ends of the tabs or hook portions of the sheet. Upon rotation of the cylinders the four windows cooperate, such that the two heat beams converge, thereby applying heat progressively along the tabs' lengths to their base ends. Following this application of heat the cylinders are rotated to new positions with heat beams being temporarily blocked. The toothed wheel carrying the sheet and shielding tape then rotates counter-clockwise as shown until two more rows of tabs are in position to be exposed to the heat beams and the heating process is repeated. As a result of this heating step the tabs shrink and curl into the hooks 12 shown on the sheet issuing from the wheel 23, with shield tape 25 being simultaneously removed. FIG. 6 shows a segment of the new hook member 10 with its hooks 12 engaged to loops 44 of a complementary fastening member 45. Where the sheet 11 has an adhesive layer 14, it is usually necessary to pacify the adhesive exposed in the openings formed by cuts 16 by the application of a powder for example and thereby prevent danger of adhesive engagement in subsequent use.

I claim:

1. In a separable fastening device of the type including two fastening members each having an engaging surface defined by a plurality of hooking elements of flexible resilient material, certain of the hooking elements being hook-type and others being loop-type, the fastening device being characterized by the property that when the respective engaging surfaces of the fastening members are pressed together in face-to-face relationship a large number of hook-type hooking elements engage a large number of loop-type hooking elements to constitute a bond which resists separation by forces generally parallel to the interfacial plane of engagement, a fastening member comprising: a base sheet of plastic material including integral portions displaced out of and extending upwardly from the base sheet to define a plurality of flexible, resilient hook-type hooking elements, each hooking element being curled inwardly and being spaced sufficiently from each other to engage releasably a large number of loop-type hooking elements of the other fastening member.

2. A separable fastening device according to claim 1 wherein each hooking element includes a tip portion for engaging loop-type hooking elements.

3. A separable fastening device according to claim 2 wherein the hooking elements are triangular tabs cut in the base sheet, the tip portion of each hooking element being a point of the triangle.

4. A separable fastening device according to claim 1 wherein the hooking elements extend upwardly from the base sheet to a height of about 10 to 100 mils.

5. A separable fastening device according to claim 1 wherein the base sheet is an axially oriented heat-shrinkable plastic material.

6. A separable fastening device according to claim 5 wherein the plastic material is mono-axially oriented in a direction coincident with the axes of the hooking elements.

7. A separable fastening device according to claim 1 wherein the base sheet is polyethylene terephthalate resin having a thickness of about 0.5 to 15.0 mils.

References Cited

UNITED STATES PATENTS

| 2,772,757 | 12/1956 | Hammond | 161—111X |
| 2,891,347 | 6/1959 | Swint | 24—204UX |
| 2,942,300 | 6/1960 | Masters | 264—230 X |
| 2,952,037 | 9/1960 | Ruck | 264—230X |
| 3,000,057 | 9/1961 | Swedlow | 264—230 |
| 3,031,730 | 5/1962 | Morin | 24—204 |
| 3,092,439 | 6/1963 | Harrison | 264—156X |
| 3,116,120 | 12/1963 | Koskinen | 161—110X |

FOREIGN PATENTS

| 956,320 | 1/1950 | France | 24—205.13 |
| 715,587 | 1/1942 | Germany | 24—205.12 |
| 240,208 | 9/1925 | Great Britain | 161—111 |
| 21,225 | 12/1929 | Netherlands | 161—111 |

BERNARD A. GELAK, Primary Examiner

U.S. Cl. X.R.

161—110; 264—230